United States Patent [19]

Hall et al.

[11] 3,852,358
[45] Dec. 3, 1974

[54] PROCESSES FOR REACTING DI-SUBSTITUTED DIENOPHILES WITH CYCLOPENTADIENE

[75] Inventors: John B. Hall, Rumson; James Milton Sanders, Eatontown, both of N.J.

[73] Assignee: International Flavors & Fragrances, Inc., New York, N.Y.

[22] Filed: Dec. 7, 1972

[21] Appl. No.: 311,709

[52] U.S. Cl............ 260/586 G, 260/587, 252/522, 260/586 C
[51] Int. Cl............................................ C07c 45/00
[58] Field of Search....................... 260/586 R, 587

[56] References Cited
UNITED STATES PATENTS
2,407,508  10/1946  Morris et al. .................... 260/586 R
2,957,906  10/1960  Erickson et al. ............. 260/586 R X OTHER PUBLICATIONS
Sauer, "Angewante Chem. Int. Ed.," Vol. 6, pp. 24, (1967), (cited by Applicants).

Norton, "Chem. Reviews," Vol. 31, pp. 441–443, (1942), (cited by Applicants).

Primary Examiner—Leon Zitver
Assistant Examiner—Norman P. Morgenstern

[57] ABSTRACT

Processes for reacting a di-substituted dienophile having the formula:

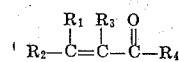

wherein $R_1$ and $R_4$ are alkyl groups, and one of $R_2$ and $R_3$ is an alkyl group and the other is hydrogen, with cyclopentadiene in the presence of Lewis acid halide catalysts to produce cycloalkenyl derivatives.

12 Claims, No Drawings

PROCESSES FOR REACTING DI-SUBSTITUTED DIENOPHILES WITH CYCLOPENTADIENE

BACKGROUND OF THE INVENTION

The present invention relates to processes for producing cycloalkenyl derivatives from cyclopentadiene and certain di-substituted dienophiles in good yields and under relatively mild reaction conditions.

The Diels-Alder reaction is well-known in the field of organic chemistry, and a classic example thereof is the reaction of a conjugated diene with a conjugated alkylene carbonyl compound to provide a cyclic compound containing a methylene bridge. Since the original reaction was set forth, there have been many variations of the reaction. While certain compounds such as maleic anhydride and conjugated dienes react at room temperature to form cyclic derivatives, many other similar reactions require the use of more aggressive reaction conditions, and in many instances even these conditions do not provide very good yields of cyclic product.

U.S. Pat. No. 2,373,568 shows the Diels-Alder reaction of methacrolein and cyclopentadiene under pressure at about 140°C to provide a material with a camphoraceous aroma and the further reaction of the Diels-Alder product with acetone and sodium methylate to provide a product with a floral type odor. Vaughan et al in *J.A.C.S.* 74, 5355 show the reaction of mesityl oxide and cyclopentadiene produced in situ by thermal depolymerization of the dimer to provide an unsaturated ketone by carrying out the reaction at 160°C for 12 hours to provide a 21 percent yield, based upon cyclopentadiene, although the yield based upon mesityl oxide consumed was said to be 60 percent.

*Chemical Abstracts* 47, 12271e shows a diene condensation at 160°C in the presence of pyrogallol. A condensation of isoprene and other materials with mesityl oxide at 200°C is shown in *Chemical Abstracts* 72, 89854p. The use of haloacetic acids as catalysts in diene reactions is shown in French Pat. No. 838,454. Wasserman concluded that diene synthesis rates were not appreciably affected by a number of catalysts including ferric chloride in ethanol in *J. Chem. Soc.* 3346 (1949).

*Chemical Reviews* 31, 441 reported a reaction between anthracene, maleic anhydride and aluminum chloride. U.S. Pat. No. 2,724,730 shows the condensation of hexachlorocyclopentadiene with a dienophilic compound in the presence of aluminum chloride at 110°C. Aluminum chloride is said to catalyze a Diels-Alder reaction in *J. Org. Chem.* 26, 4778. The *International Edition of Angew. Chem.* 6, 24 states that Lewis acids have an effect on the yields of stereoisomers in diene additions and mentions the possibility of an investigation of reactions at low temperatures in the presence of Lewis acids under mild conditions to obtain uniform Diels-Alder products. A low temperature Diels-Alder reaction is shown in *Chemical Abstracts* 59, 15191d, and regulation of structural isomerism and acceleration of Diels-Alder reaction is shown in *J.A.C.S.* 86, 3899. Diels-Alder reactions catalyzed by aluminum chloride are also shown in *J. Organic Chem.* 30, 3567, and *J. Organic Chem.* 32, 1121. See also *Tetrahedron* 19, 2333 (1963).

The Diels-Alder reaction of certain aldehydes with dienes in the presence of stannic chloride and boron trifluoride is shown in a translation of an article from *Zh. Org. Chimii* 6, 2446. Dienaphilic compounds for Diels-Alder reactions are shown in *Chemical Review* 31, 327 and in Onishchenko, *Diene Synthesis* at page 904ff. British Pat. No. 835,840 (also *J.A.C.S.* 82, 4436) shows acceleration of the Diels-Alder reaction with stannic chloride. Acceleration with aluminum chloride is shown in *J.A.C.S.* 82, 4436. U.S. Pat. Nos. 3,047,433 and 3,067,244 show the use or production of Diels-Alder adducts.

British Patent Specification No. 1,076,304 shows a Diels-Alder reaction to produce nitriles and esters. The effect of substituents on dienophiles is discussed by Carruthers, *Some Modern Methods of Organic Synthesis* at page 117ff, where it is stated that β,β-disubstituted dienophiles are almost unable to take part in diene condensations.

There is a large body of chemical literature concerning Diels-Alder reactions, as instanced by the foregoing. Generally, however, the reactions shown in the art are conducted under severe conditions or produce low yields of the desired products.

THE INVENTION

Surprisingly, it has been found that certain α,β- and β,β-disubstituted dienophiles can be reacted with cyclopentadiene under mild conditions in the presence of specific catalysts to obtain cyclic Diels-Alder reaction products in good yields and in relatively short times. Briefly, the present invention contemplates a process to provide cyclic derivatives, which process comprises reacting cyclopentadiene with a substituted dienophile having the formula

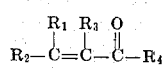

wherein $R_1$ and $R_4$ are alkyl groups, and one of $R_2$ and $R_3$ is an alkyl group while the other is hydrogen, in the presence of a Lewis acid halide catalyst and the cyclic derivative so produced is recovered. The alkyl groups represented in the foregoing formula for the ketone can be the same or different. The aforesaid reaction is desirably carried out in the presence of a reaction vehicle, as described herein. The cyclic derivatives so produced can assume several isomeric forms, and the invention further contemplates an isomerization utilizing alkali metal alkoxides as described herein.

The cyclic products produced according to the present process are herein denominated as norbornene derivatives, and such products are suited to a variety of uses as hereinafter further described. Thus, the product obtained when the dienophile is mesityl oxide is 2-acetyl-3,3-dimethyl-5-norbornene. This compound is obtained in two forms, exo and endo. For uniformity herein, the exo form will be considered to have the structural formula

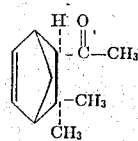

and the endo form will be considered to have the structural formula

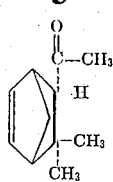

wherein the dashed lines are intended to represent bonds extending downwardly from the plane of the ring on which they appear and the solid lines represent bonds extending upwardly from the plane.

The two forms of norbornene derivative just mentioned are both useful for perfumery and other fragrance applications, and mixtures thereof are also useful. There is a detectable difference between the two isomers, but the differences are not outstanding, so that either isomer or a mixture thereof is useful.

As is known in the art, cyclopentadiene has a propensity to dimerize to form a dicyclic compound. The monomer itself is an active reactant in the process of this invention, but it can be obtained from the dimer. The term cyclopentadiene is to be construed herein to include material produced from the dimer by thermal depolymerization of the dimer shortly prior to use in the presently disclosed process.

The cyclopentadiene utilized should be relatively pure, preferably more than 95 percent pure, to assure high conversion. All parts, percentages, proportions and ratios herein are by weight unless otherwise indicated.

It is generally desirable that alkyl groups, when and as present, of the dienophiles contain from one to about eight carbon atoms. It is preferred in certain embodiments of the invention that the alkyl groups in the dienophile formula are those containing from one to three carbon atoms. Especially preferred dienophiles for use herein are those wherein $R_1$, $R_2$, and $R_4$ are methyl, $R_3$ being hydrogen (mesityl oxide), and wherein $R_1$ is hydrogen, $R_2$, $R_3$, and $R_4$ are methyl (3-methyl-3-penten-2-one). The dienophiles should also be preferably of high purity to assure high conversion. The ketones are particularly preferred in certain embodiments of the present invention.

It is also desirable, as noted above, to carry out the reaction in the presence of a liquid reaction vehicle. The vehicle is preferably a solvent for the reactants and catalyst system utilized and such vehicles have been found to improve yields markedly while affording good control over the reaction. Preferred reaction vehicles include halogenated hydrocarbons, desirably chlorinated lower hydrocarbons such as methylene chloride, chloroform, and the like, and aromatic hydrocarbons, particularly halogenated mononuclear aromatic hydrocarbons, such as dichlorobenzene, and the like, and mononuclear aromatic alkylated liquids such as toluene, xylene and the like. The quantity of vehicle utilized can range from none to about 300 g for each mole of cyclopentadiene in the reaction mixture. It is preferred to use from about 100 g to 250 g of vehicle for each mole of the diene.

The catalysts found suitable for use in the process of the present invention are Lewis acid halide materials. The preferred catalysts include aluminum chloride, stannic chloride, bismuth trichloride, titanium tetrachloride, ferric chloride, and boron trihalide, such as boron trifluoride and the like. It will be appreciated by those skilled in the art from the present disclosure that adducts of such Lewis acid catalysts, for example, boron trifluoride etherate, are also intended to be included within the aforesaid catalysts.

The quantity of catalyst varies depending upon the particular reactants, the reaction vehicle, the temperature and time of the reaction, and the particular catalyst or combination thereof used. For example, it has been found that certain embodiments of the invention utilize approximately four times as much titanium tetrachloride as is required with aluminum chloride catalyst. Broadly, the amount of catalyst can be present in a ratio of from 0.005 moles to about one mole of catalyst for each mole of cyclopentadiene. Generally, however, modest amounts of catalyst on the order of from 0.02 to about 0.05 moles per mole of the diene are preferred.

The ratio of the cyclopentadiene to the dienophile can be above, below, or equal to the stoichiometric amount, but general economy in certain embodiments of the processes make approximately stoichiometric amounts desirable. It is preferred in many embodiments of the invention that the dienophile be present in an amount from about equimolar up to a 20 percent molar excess over the cyclopentadiene.

One of the outstanding advantages of the present processes is the modest temperatures required to achieve good yields and satisfactory reaction times. Generally, the temperature is in the range of from about 0°C to about 50°C, and in a preferred embodiment of the invention the temperature is from about 15°C to about 30°C. Even at these modest temperatures reaction times on the order of from about one to about 10 hours are achieved, and it is generally preferred to carry out the reaction for about three to 6 hours.

The reaction of this invention can be carried out over a range of pressures, but since the process does not require special high-pressure techniques like those of the prior art, it is especially preferred to conduct the reaction at atmospheric pressure. Another of the advantages of the present invention is the freedom in admixing reagents. It is possible to use any combination of sequential or simultaneous addition of the cyclopentadiene, the dienophile, and the catalyst. It has been found desirable in obtaining the highest possible yields sequentially to add first the dienophile and then the diene to the catalyst, in this instance the catalyst having been suspended or otherwise mixed into a reaction vehicle.

The cyclic product from the process can be washed with salt solutions, acids, and/or bases to remove reaction products and to provide an initial cleansing of the product. The cyclic product is recovered from the reaction mixture and can then be subjected to conventional purification and/or isolation techniques such as distillation, crystallization, extraction, preparative chromatographic techniques and the like. It is especially preferred to purify the materials by vacuum distillation, and adjuvant materials such as anti-oxidants, petroleum base oils, trialkanolamines and the like can be used. Triethanolamine is a preferred agent for removing any traces of halo compounds before or during the distillation.

In certain embodiments of the invention the ratio of the exo to the endo forms of the cyclic materials produced is on the order of about 0.15 to about 0.50. The prior art methods using thermal conditions, that is relatively high temperatures and pressures, produce materials having an exo/endo ratio of 2.5 to 2.7. With some materials there may be a slight preference for exo isomer, and in these cases the cyclic material can be isomerized by heating with an alkali metal alkoxide in a suitable lower alkanol vehicle. The alkoxides are preferably lower alkyl-derived materials having from one to three carbon atoms and the preferred alkali metals include sodium and potassium. An especially preferred alkali metal alkoxide is sodium methylate. The molar ratio of alkoxide to the norbornene derivative is desirably from about 0.2 to 0.4.

The vehicle used is an alcoholic material, preferably an absolute lower alkanol having from one to three carbon atoms. The alkanol and alkoxide have the same number of carbon atoms in certain embodiments of the invention. A preferred medium for the isomerization is methanol.

The isomerization is carried out at temperatures from about 50° to about 80°C, and with the preferred sodium methoxide-methanol system, temperatures of 60°–70°C are utilized. At these temperatures reaction times of from about one to about 24 hours provide good results and can raise the exo/endo ratio from about 0.2 to about 2.6.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of Acetyldimethylnorbornene

A one-liter reaction flask equipped with stirrer, thermometer, addition funnel, and reflux condenser is charged with 100 ml of methylene chloride and 5 g of stannic chloride. The contents are stirred and cooled to 0°–5°C. Fresh cyclopentadiene is produced by heating at 160°C and atmospheric pressure dicyclopentadiene, distilling the product through a 36-inch Vigreaux column, and collecting the cyclopentadiene in a dry ice trap. A mixture of 100 g of mesityl oxide and 160 g of fresh cyclopentadiene is prepared and added slowly during five hours to the stannic chloridemethylene chloride mixture while the temperature is maintained between −3° and +4°C. After addition is complete the reaction mass is allowed to warm up to 20°–23°C and maintained in that temperature range for nine hours.

Then 100 cc of 5 percent aqueous hydrochloric acid is added to the reaction mass with stirring. The aqueous phase is extracted with 50 cc portions of methylene chloride and the organic phases are combined and washed successively with 100 cc portions of 5 percent aqueous hydrochloric acid, water, 5 percent sodium carbonate aqueous solution, and water. The organic material is distilled at a vapor temperature of 78°–79°C and a pressure of 3.1–3.2 mm Hg (reflux ratio 2:1 to 6:1).

Analyses by IR (infrared) and NMR (nuclear magnetic resonance) spectroscopy and GLC (gas-liquid chromatography) show the product is a mixture of the endo and exo isomers of 2-acetyl-3,3-dimethyl-5-norbornene.

EXAMPLE II

Isomerization of Acetyldimethylnorbornene

Twenty-five grams of the mixture of acetyldimethylnorbornene isomers prepared in Example I is intimately admixed with 2 g of sodium methylate in 100 ml of absolute methanol and refluxed at 67°–68°C for various times to provide ratios of exo to endo isomers as shown in Table I.

TABLE I

| Time of Reflux | Mole ratio exo/endo |
|---|---|
| None | 0.20 |
| 1 minute | 0.219 |
| 1.33 hours | 2.11 |
| 24 hours | 2.58 |

EXAMPLE III

A 12-liter, 3-neck flask equipped with a stirrer, thermometer, addition funnel, reflux condenser, and cooling bath is charged with 66 g (0.5 moles) of aluminum chloride and then with 2,200 g of toluene to form a suspension. The suspension is cooled to 20°–25°C and 2,940 g (30 moles) of mesityl oxide is charged to the suspension with external cooling as required to maintain 20°–25°C. Dicyclopentadiene is heated at 170°–250°C in a flask equipped with a packed column to produce cyclopentadiene which is distilled at 40°C and held in a dry ice trap at −40°C until required.

A solution of 1,670 g (25 moles) of cyclopentadiene so prepared and 2,200 g of toluene is added to the suspension during three hours with external cooling to maintain the temperature at 20°–25°C. After this addition is completed, the reaction mixture is stirred at 20°–25°C until GLC indicates less than one percent cyclopentadiene remains, this condition occurring after about one additional hour.

The reaction mass is poured into 2 kg of ten percent aqueous sodium chloride with good stirring, and the stirring is continued for 30 minutes. The aqueous and organic layers are separated, and the organic layer is washed once with 2 kg of 10 percent aqueous sodium chloride solution and once with 2 kg of 20 percent aqueous sodium chloride solution.

The chloride content of the washed material is ascertained, and sufficient triethanolamine equivalent to the chloride content and a five percent excess of amine is added to the reaction mixture. The reaction mixture is then vacuum-distilled at 40–50 mm Hg to recover the toluene and unreacted mesityl oxide, and the product is then recovered at 3–5 mm Hg. The exo/endo ratio at this point is about 0.12.

This recovered product with three percent Primol hydrocarbon oil and 0.1 percent Ionol antioxident added is then fractionated at 3–3.5 mm Hg on an 18-inch Goodloe packed column. The fraction boiling at 78°–80°C and 3.1–3.5 mm Hg has an excellent aroma and provides a total of 1408 g of 2-acetyl-3,3-dimethyl-5-norbornene product. The theoretical yield is 66.9 percent based on mesityl oxide and 66.0 percent based on cyclopentadiene.

EXAMPLE IV

A one-liter reaction flask equipped with stirrer, thermometer, addition funnel and reflux condenser is charged with 200 g of toluene, 7.6 g of titanium tetrachloride, and 245 g of mesityl oxide. The contents of the flask are maintained at 20°–25°C while a solution of 132 g of cyclopentadiene in 200 g of toluene is added during 1.25 hours. An additional 30.3 g of titanium tetrachloride in 100 g of toluene is then added, so that the total amount of titanium tetrachloride added is 0.20 mole.

A mildly exothermic reaction ensues while the reaction mass is held at 20°–25°C by external cooling with an ice bath. At the end of four hours, the reaction mass is washed successively with one 500 ml portion of ten percent aqueous sodium chloride, one 250 ml portion of ten percent aqueous sodium chloride and one 250 ml portion of saturated aqueous sodium chloride. The washed reaction mass is then admixed with 40 g of triethanolamine and after stripping off the solvent, distilled at 2–3 mm Hg and 110°–115°C to give a 68 percent yield of a mixture of endo and exo isomers of 2-acetyl-3,3-dimethyl-5-norbornene.

EXAMPLE V

Reaction of 3-Methyl-3-penten-2-one with Cyclopentadiene

A 2-liter reaction flask equipped with a stirrer, thermometer, addition funnel and reflux condenser is charged with a mixture of 0.1 mole of aluminum chloride and 750 g of toluene. During a five-minute period, 5.5 moles of 3-methyl-3-penten-2-one is added. Over two hours while maintaining the temperature of the reaction mass at 20°–25°C, a solution of 5 moles of cyclopentadiene in 250 g of toluene is added.

After maintaining the reaction mass at 25°C for four hours with stirring, and the mass is washed successively with one 500 ml portion of ten percent aqueous sodium chloride, one 250 ml portion of ten percent aqueous sodium chloride, and one 250 ml portion of saturated aqueous sodium chloride solution, the solvent is stripped off the washed material and 40 g of triethanolamine is added to the reaction mass. The reaction mass is rushed over at 68°–117°C and 3–4 mm Hg. The product is then fractionated, at a reflux ratio of 2:1, a temperature of 70°C, and 2.4–2.5 mm Hg pressure. The yield of the novel 2-acetyl-2,3-dimethyl-5-norbornene product is 744 g, equivalent to 73 percent yield based on 3-methyl-3-penten-2-one. IR, GLC and NMR analyses show that the reaction product is a mixture of exo and endo isomers.

EXAMPLE VI

A one-liter, 3-neck flask equipped with a thermometer, reflux condenser and mechanical stirrer is charged with a suspension of 5.7 g (0.04 moles) of boron trifluoride etherate in 200 ml of chloroform and 245 g (2.5 moles) of mesityl oxide is added to this suspension with mild external cooling as needed to maintain the temperature in the range of 20°–25°C. A solution of 137 g (2.0 moles) of 96.4 percent pure cyclopentadiene in 200 ml of chloroform and 25 g of o-dichlorobenzene is added to the reaction mixture during three and one-half hours while the temperature is maintained at 20°–25°C.

The mixture so produced is successively stirred thrice with 250 cc portions of water, once with 250 cc of one percent aqueous sodium bicarbonate, and once with 250 cc of water, and the aqueous layers are extracted with 100 ml of chloroform. The chloroform extract and the organic layer are combined and stripped to remove the solvent.

The crude product with 50 g of Primol hydrocarbon oil is distilled under 2 mm Hg pressure yielding 194 g of 2-acetyl-3,3-dimethyl-5-norbornene.

What is claimed is:

1. A process for producing cyclic derivatives which comprises reacting cyclopentadiene with a substituted dienophile having the formula

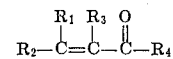

wherein $R_1$ and $R_4$ are alkyl groups, and one of $R_2$ and $R_3$ is an alkyl group and the other is hydrogen, the alkyl groups having from one to about three carbon atoms and being the same or different, in the presence of aluminum chloride, bismuth trichloride, stannic chloride, titanium tetrachloride, ferric chloride, or boron trihalide as a Lewis acid catalyst to obtain a cycloalkenyl derivative and in the presence of a liquid reaction hydrocarbon or halogenated hydrocarbon vehicle at a temperature of from about 0°C to 50°C.

2. A process according to claim 1 wherein the reaction vehicle is a halogenated aliphatic hydrocarbon or a halogenated or alkylated mononuclear aryl compound.

3. A process according to claim 1 wherein the cyclic derivative is recovered from the reaction mixture.

4. A process according to claim 1 wherein the alkyl groups are methyl or ethyl.

5. A process according to claim 1 wherein $R_1$, $R_2$, and $R_4$ are methyl, and $R_3$ is hydrogen.

6. A process according to claim 1 wherein $R_1$, $R_3$, and $R_4$ are methyl, and $R_2$ is hydrogen.

7. A process according to claim 1 wherein the temperature is from about 15°C to about 30°C.

8. A process according to claim 1 wherein the pressure at which the reaction is carried out is substantially atmospheric.

9. A process according to claim 1 wherein the amount of catalyst ranges from about 0.02 to about 0.05 moles for each mole of cyclopentadiene.

10. A process according to claim 1 wherein the reaction is carried out for from about one to about ten hours.

11. A process according to claim 1 wherein the cyclic derivative is isomerized by treatment with an alkali metal alkoxide having from one to about three carbon atoms in an alcoholic reaction vehicle which is a lower alkanol having from one to about three carbon atoms.

12. A process according to claim 11 wherein the alkoxide is sodium methylate and the alcohol is methanol.

* * * * *